United States Patent [19]
Küchel et al.

[11] Patent Number: 5,357,341
[45] Date of Patent: Oct. 18, 1994

[54] METHOD FOR EVALUATING INTERFEROGRAMS AND INTERFEROMETER THEREFOR

[75] Inventors: Michael Küchel, Oberkochen; Karl-Heinz Schuster, Bad Wurzach; Klaus Freischlad, Aalen-Unterkochen, all of Fed. Rep. of Germany

[73] Assignee: Carl-Zeiss-Stiftung, Heidenheim, Fed. Rep. of Germany

[21] Appl. No.: 912,285

[22] Filed: Jul. 13, 1992

[30] Foreign Application Priority Data
Jul. 22, 1991 [DE] Fed. Rep. of Germany ....... 4124223

[51] Int. Cl.$^5$ .............................................. G01B 9/02
[52] U.S. Cl. ..................................... 356/353; 356/360
[58] Field of Search ................. 356/353, 359, 360, 345

[56] References Cited

U.S. PATENT DOCUMENTS

| | | | |
|---|---|---|---|
| 3,867,009 | 2/1975 | Pawluczyk | 350/3.5 |
| 4,639,139 | 1/1987 | Wyant et al. | 356/359 |
| 4,643,576 | 2/1987 | Kanoh et al. | 356/359 |
| 4,660,978 | 4/1987 | Wu | 356/353 |
| 4,732,483 | 3/1988 | Biegen | 356/359 |
| 4,768,881 | 9/1988 | Jüptner et al. | 356/347 |
| 4,813,782 | 3/1989 | Yagi et al. | 356/359 |
| 5,020,901 | 6/1991 | DeGroot | 356/345 |
| 5,112,129 | 5/1992 | Davidson et al. | 356/359 |
| 5,210,591 | 5/1993 | De Groot | 356/357 |

FOREIGN PATENT DOCUMENTS 3936118 5/1990 Fed. Rep. of Germany.

OTHER PUBLICATIONS

"Absolute Measurement of Flat Mirrors in the Ritchey–Common Test" by F. M. Küchel, Workshop on Optical Fabrication and Testing, Oct. 1986.

Primary Examiner—Robert J. Warden
Assistant Examiner—Krisanne M. Thornton
Attorney, Agent, or Firm—Walter Ottesen

[57] ABSTRACT

The invention relates to an evaluation method for interferograms and an interferometer corresponding thereto with which tile influence of coherent noise is reduced with simultaneously high interference contrast. Several phase maps are computed from interferograms which are recorded with coherent light. The interferogram components of the test object and the interferogram components of the coherent noise are displaced relative to each other in the camera plane between recording the interferograms. The influence of the coherent noise is suppressed by subsequently averaging the phase maps.

26 Claims, 6 Drawing Sheets

METHOD FOR EVALUATING INTERFEROGRAMS AND INTERFEROMETER THEREFOR

BACKGROUND OF THE INVENTION

Today, lasers are used almost exclusively as illuminating sources in modern two-beam interferometers such as the interferometers of the Fizeau, Twyman-Green or Mach-Zehnder types. This affords the advantage that a high beam flux can be obtained in a very small spatial angle and simultaneously in a very small wavelength range. For the construction and use of the interferometers, the advantage is afforded that interferences occur which are rich in contrast even when the optical paths of the test wave and reference wave are of respectively different lengths. This is a consequence of the fact that laser light of this kind has a very high spatial coherence because of the small spatial angle and has a high temporal coherence because of tile narrow spectral bandwidth.

Because of the high spatial and temporal coherence of the laser light source, the undesirable side effect results that unwanted light in the interferometer (such as scattered light because of residual roughness of the lenses or of the beam splitters) reaches the camera in addition to the two superposed primary waves (test wave and reference wave). The unwanted light is coherently superposed on the primary interference pattern and therefore the interferogram is falsified. This superposition is known as coherent noise.

In interferometry, the task is present to determine the phase difference $\phi(x, y)$ between the test wave and the reference wave with high spatial resolution as well as with high resolution as to magnitude. The phase differences as a function of the position coordinate or the position coordinates are identified as phase function. The coherent superposed unwanted light leads then to a roughening the phase function $\phi(x, y)$. Especially high- and mid-frequency spatial frequency components $\phi(x, y)$ develop with respect to the phase function $\phi(x, y)$. In the case of a smooth test surface, which should lean to a smooth test wave and therefore also to a smooth function $\phi(x, y)$, a measured phase function $\phi_m(x, y)$ results which shows disturbances $\delta(x, y)$ having short periods.

Published German patent application 3,936,118 discloses a Mireau interferometer wherein a rotating ground glass screen is mounted between the laser and the interferometer input. Each scattering element of the ground glass screen scatters the light in another spatial direction and thereby defines a secondary light source. The light collimated behind the ground glass screen by a lens then has a low spatial coherence since it arises from the incoherent superposition of the light of the many secondary light sources.

Because of the low spatial coherence, the false light then leads to a more or less uniform light distribution which is superposed onto the interferogram made up of the test light wave and the reference light wave. However, it is disadvantageous that, because of the low spatial coherence, also the interference contrast becomes less in the interferogram. This reduction of the interference contrast is that much greater the greater the optical path difference is between the test wave and the reference wave. However, for low interference contrast, the precision with which the phase difference $\phi(x, y)$ can be determined is less. Accordingly, a rotating ground glass disc of the kind described is not a satisfactory solution in interferometers having different optical path lengths in the reference and measuring beam path such as with a Fizeau interferometer.

U.S. Pat. No. 3,867,009 discloses a holographic microscope having a beam deflection device mounted behind the laser. During the illumination of the photographic film, the direction of the light beams in the reference and in the measuring beam path is varied. In this way, the speckles caused by coherent noise are moved in the hologram plane relative to the image of the object. The interfering light does have high spatial coherence at each time point. However, the variation of the direction of incidence of the light rays on the one hand and the temporal integration which the photographic film carries out on the other hand, characterizes the hologram as a temporally-incoherent sum of spatially coherent rays of varying direction of incidence. Although the coherent noise is suppressed by the temporally-incoherent summation, the interference contrast is however reduced simultaneously if reference beam path and measuring beam path do not have the same optical path lengths which is the case here.

U.S. Pat. No. 4,768,881 discloses a method by means of which the phase function of an individual multiple-fringe interferogram can be computed by means of a Fourier transformation. In addition, the selection of suitable filter functions is suggested for the Fourier transformation in order to suppress during the evaluation those mean or high frequency spatial frequency components which are caused by the coherent noise. The spatial frequency filtering however has the disadvantage that the signal components in the filtered spatial frequency range which are caused by the test object are suppressed to the same extent.

The paper of F. M. Küchel entitled "Workshop on Optical Fabrication and Testing" published by the Optical Society of America, October 1986, discloses that, for the interferometric testing of mirrors, several measurements are averaged and the test object is rotated about the perpendicular to its surface between the measurements. In this way, the influences of gravitation are eliminated from the averaged measuring result. However, the problem of coherent scattering is not touched in this paper and no suggestion can be derived as to the spatial coherence of the measurement light.

SUMMARY OF THE INVENTION

It is an object of the invention to suppress the effects of the coherent noise on the phase difference between the test object wave and the reference wave in an interferometer while simultaneously achieving high interference contrast. At the same time, mid and high frequency spatial components produced by the test object should remain in the phase function.

According to the invention, the light interfering on a camera has a high spatial and temporal coherence. Because of the high spatial coherence, the interference contrast is great in each individual interferogram. At the same time, each individual interferogram contains the disturbances caused by coherent noise. A phase map, that is a map of the phase values in the interferogram as a function of position is prepared from each individual interferogram or each individual interferogram group. The disturbances which are caused by coherent noise are contained in these phase maps. Between the recordation of the interferograms, a relative movement is generated between the interferogram components caused by the test object and the interferogram components caused by scattering or noise (that is, by coherent noise). Because of this relative movement, the components of the phase maps caused by coherent noise can be computed in the computer.

With respect to the foregoing, it is essential that the interferograms are produced by interference of light of high spatial and temporal coherence, that is, by laser light without means inserted therebetween which reduce the coherence of the light and that phase maps are computed from such interferograms and only thereafter the interferogram components caused by coherent noise are eliminated by considering several phase maps.

Numerous methods are known for computing the phase maps. A good overview of such evaluation algorithms is presented in the dissertation of B. Dörband entitled "Analyse optischer Systeme mit Hilfe von automatischer Streifenauswertung und Strahldurchrechnung", Stuttgart, 1986. In principle, all of these methods are applicable. With the so-called dynamic methods, several interferograms, that is a group of interferograms, are necessary in order to compute a single phase map. However, the static methods are especially preferable wherein only a single multiple-fringe interferogram is necessary for computing the phase map such as the method disclosed in U.S. patent application Ser. No. 694,656, filed May 2, 1991, now abandoned, incorporated herein by reference. U.S. patent continuation-in-part application Ser. No. 08/044,105 was filed on Apr. 8, 1993 in favor of said abandoned patent application Ser. No. 694,656.

The computer elimination of interferogram components caused by coherent scattering preferably takes place by averaging several phase maps which are prepared after carrying out relative movements. The averaging can take place in video real time by means of the hardware of an evaluating computer.

Preferably, an image memory is provided wherein the phase values belonging to one test object point are always stored at the same memory location independently of the relative movement. With the subsequent averaging, it is then ensured that always the measured values for the same test object point are accumulated.

A triangulation scanner is disclosed in U.S. Pat. No. 4,973,152 wherein the light beam is scanned and the signal received from the image recorder is time averaged for suppressing coherent noise figures. In such triangulation scanners, the time averaging however takes place by means of the image recorder; whereas, according to the invention, the averaging takes place in the computer. Furthermore, no phases are evaluated or phase maps prepared with triangulation scanners.

In a preferred embodiment, the test object is arranged so as to be movable in two directions perpendicular to the optical axis of the measuring beam path. The relative movement of the test object wave to the waves of the coherent noise components then takes place by means of movement of the test object. A corresponding arrangement for moving the test object is preferably controlled by the computer which also controls the phase evaluation. A conventional CCD-camera is well suited for recording the interferograms. The displacement of the image of the test object in the plane of the camera should amount to a whole number multiple of the pixel spacing of the camera. It is then ensured that a test object detail which is imaged in an interferogram on a light-sensitive region of the camera, is also imaged after being displaced again onto a light-sensitive region of the camera.

Furthermore, it is preferable to provide a virtual compensation of the movement of the test object relative to the camera in that the address registers are switched over from image to image corresponding to the displacement of the test object. The address registers indicate in which region of the image memory the measured values belonging to one camera pixel are stored. With the subsequent averaging, it is then likewise ensured that always measured values for the same test object points are accumulated.

The interferometer is preferably a Fizeau interferometer having a reference surface having a surface normal inclined to the optical axis of the measuring beam path. Multiple-fringe interferograms then occur. The relative movement between the test object wave and the waves of the coherent noise components can be generated for such a Fizeau interferometer also by means of a synchronous rotation of the reference mirror and of the test object about the optical axis of the measuring beam path. The reference mirror and the test object are preferably then held in a common rotatable holder.

As an alternative to rotational displacement of the test object, for a Fizeau interferometer, a plane-parallel plate, which is pivotable about two axes perpendicular to the optical axis, can be mounted also in a common region of the measuring and reference beam paths. The relative movement is then generated by pivoting the plane-parallel plate. In this way, it is ensured that the test object and the reference surface are always orientated to each other in the same way in the sequentially recorded interferograms.

In a further alternate and very simple embodiment of the invention, a beam deflecting arrangement can be provided in the interferometer input. Especially simple beam deflection devices can be realized here by means of a rotating wedge prism or by means of two wedge prisms rotating at two different speeds.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
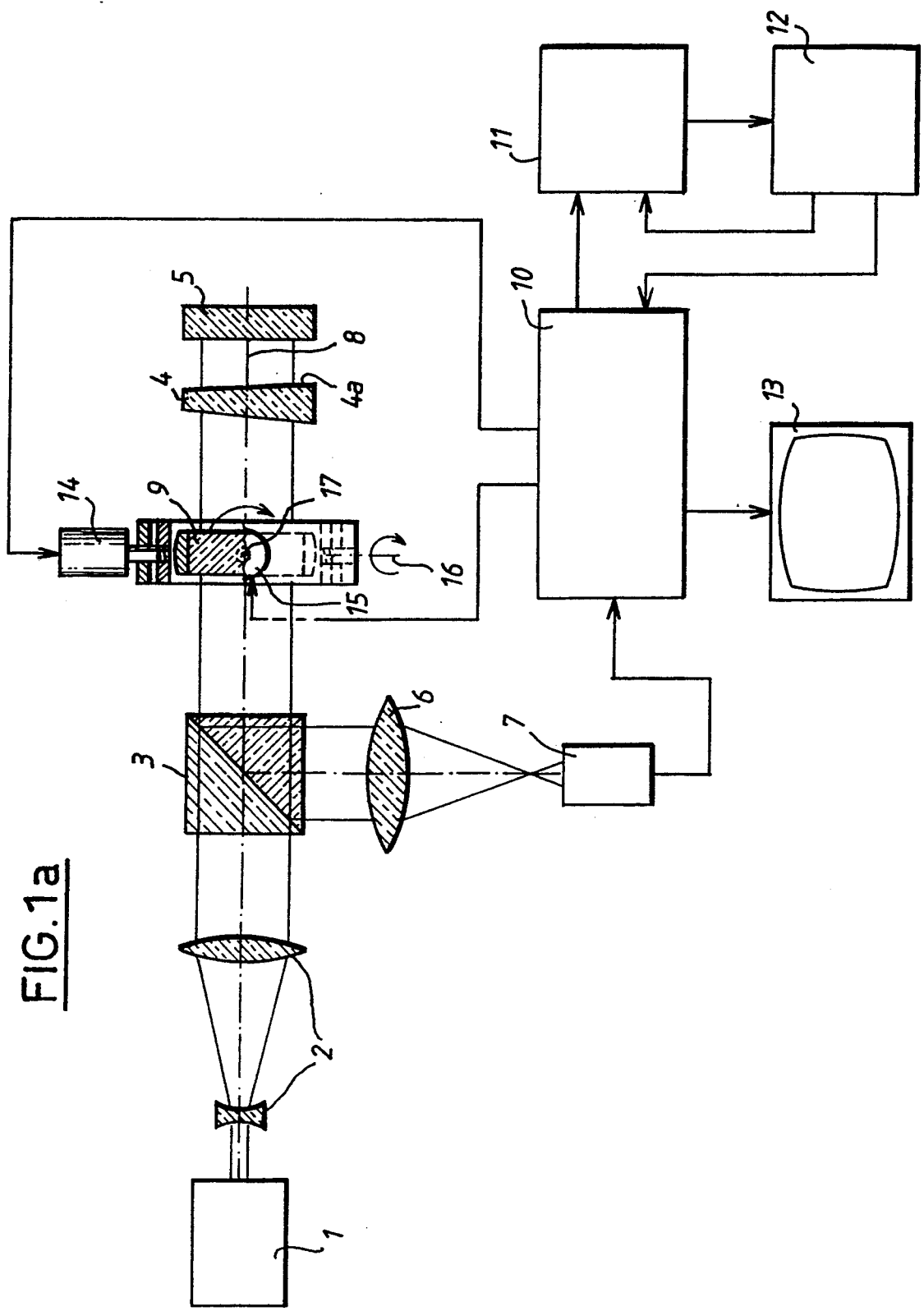
FIG. 1a is a simplified block diagram of a first Fizeau interferometer having a plane-parallel plate in the common region of the measuring and reference beam paths.

In FIG. 1a, the temporal and spatial coherent light beam of a laser 1 is expanded by a telescope 2. A Fizeau plate 4 and the test object 5 are mounted behind a beam splitter 3. The surface 4a of the Fizeau plate 4 (the reference surface) faces toward the test object 5 and is inclined to the optical axis 8 of the measuring beam path. The light reflected on the reference surface 4a and on the test object 5 is deflected by beam splitter 3 out of the illuminating beam path and interferes on the sensor of a CCD-camera 7. A lens 6 is mounted between the beam splitter 3 and the camera 7 and images the test object 5 on the light-sensitive surface of the camera 7.

The interferogram has a high interference contrast because of the high spatial and temporal coherence of the light. However, the interferogram does not occur only from a superposition of the test wave and the reference wave. A so-called coherent noise occurs because of scattering and reflection at the beam splitter 3 or at the lens 6, that is, the scattered or reflected waves interfere with the test object wave and the reference wave.

A plane-parallel plate 9 is mounted in the common region of the measuring and reference beam paths and is cardanically journalled. Because of the cardanic journal, the plate 9 is pivotable about two axes (16, 17) perpendicular to the optical axis 8. A pivot movement of this plane-parallel plate 9 generates a relative movement of the reference wave and of the test object wave relative to the waves of the coherent noise in the interferogram.

A series of interferograms at different pivoting movements of the plane-parallel plate 9 is recorded with the camera 7. The pivot movement of the plane-parallel plate 9 takes place via two stepping motors (14, 15) which are driven by a computer 10. All pivot movements of the plane-parallel plate 9 are added in such a manner that a non-central point of the plane-parallel plate 9 passes through a rectangularly-shaped surface. Each individual pivot movement takes place in such an amount that the image of the test object 5 is displaced in the plane of the CCD-camera 7 by a whole-number multiple of the pixel spacing.

The computer 10 prepares a phase map from each interferogram with the aid of the methods for evaluating static multiple-fringe images. The phase map is stored in an image memory 11. The computer 10 controls the address registers of the image memory 11 in such a manner that the phase values belonging to a test object point are stored in the image memory 11 at the same memory location independently of the pivot positions of the plane-parallel plate 9.

Figure 5:
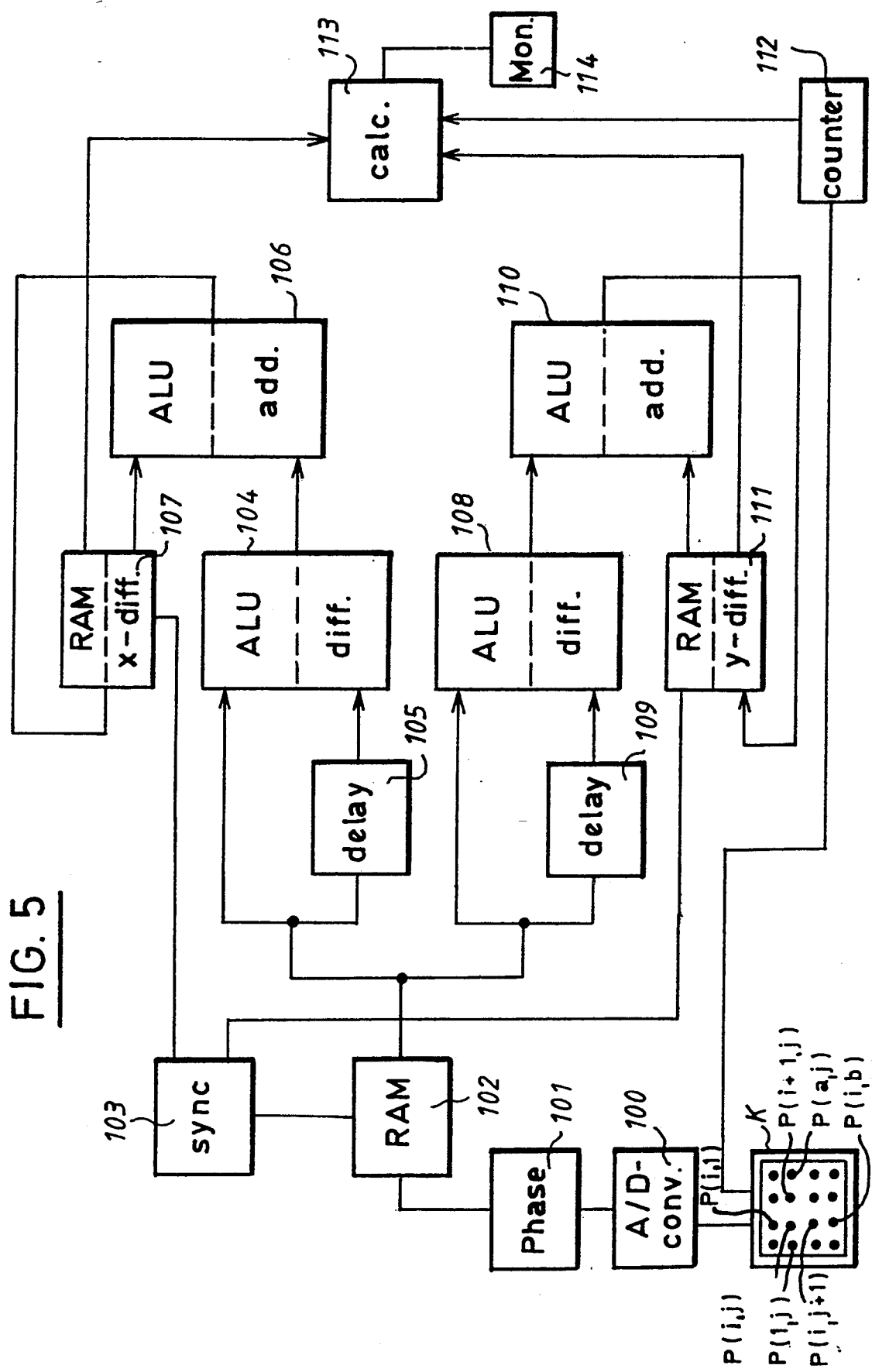

The phase maps stored in the image memory 11 are averaged in video real time by means of an arithmetic computation unit which is recursively connected; that is, the phase maps are averaged with the read-out frequency of the camera 7. FIG. 5 may be referred to for the video-rapid averaging. The averaging of the phase maps causes the amounts $\delta(x, y)$ of the coherent noise contributed to the averaged phase to be convoluted with a rectangularly-shaped surface. This convolution defines a high low-pass filtering to which, however, only the components of the coherent noise are subjected. The mean and high frequency spatial frequency components of the coherent noise are thereby greatly suppressed whereas the high and mean frequency components of the test object wave and the reference wave are completely maintained in the averaged phase map.

After the phase maps are averaged with the desired number of pivot movements of the plane-parallel plate 9, the computer 10 reads out to the image memory 11, evaluates the averaged phase map and displays the result on the monitor 13.

Figure 1B:
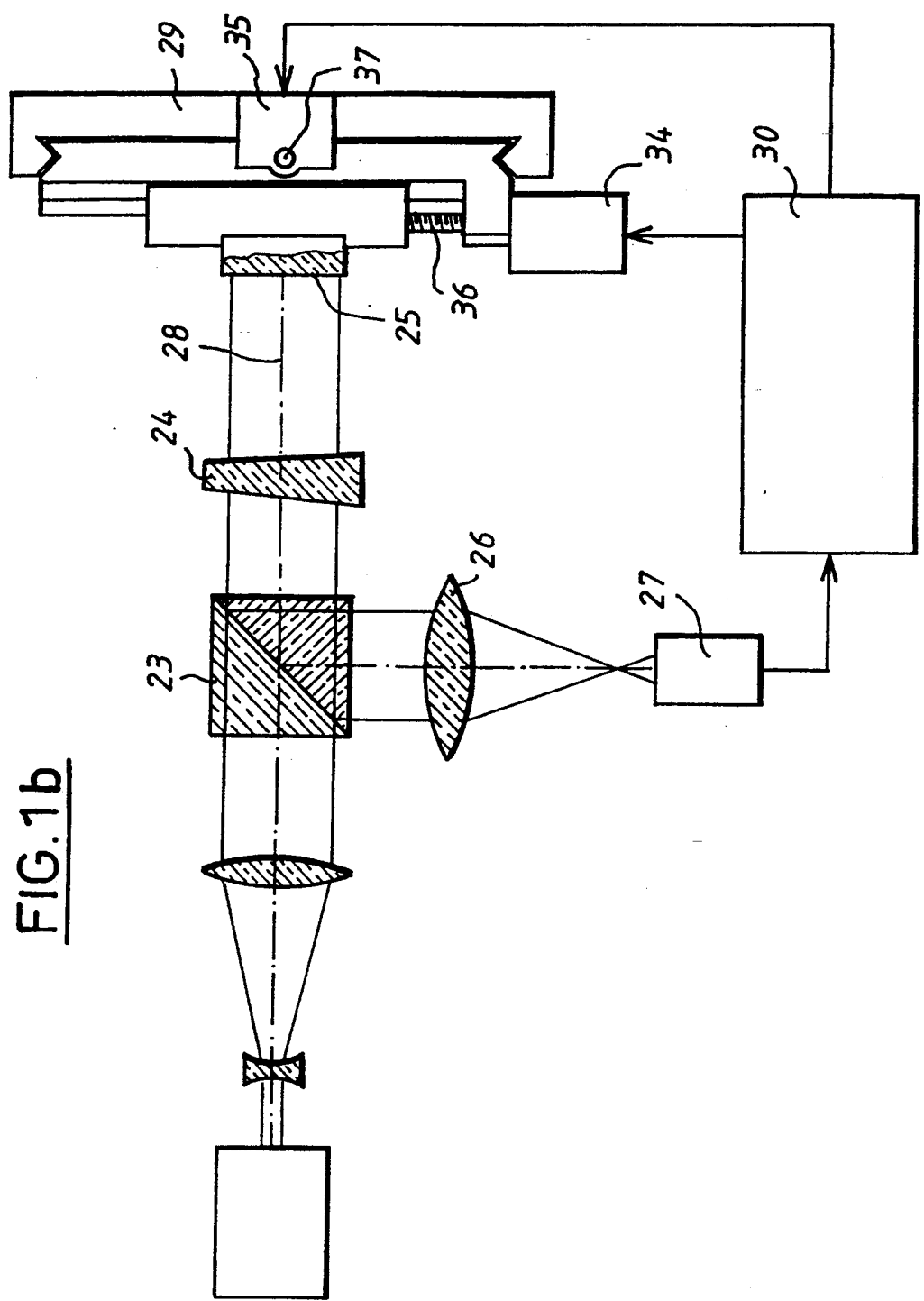
FIG. 1b is a simplified block diagram of a second embodiment with a test object displaceable in two directions perpendicular to the optical axis.

In the embodiment of FIG. 1b, the test object 25 is accommodated in a holder 29 for generating the relative movement between the interferogram components of the test object 25 and the interferogram components of the remaining optical components (Fizeau plate 24, beam splitter 23, imaging optic 26). The holder 29 is displaceable in the two directions perpendicular to the optical axis 28. For the displacement of the test object 25, two stepping motors (34, 35) and threaded spindles (36, 37) are provided. The stepping motors (34, 35) are, in turn, driven by a computer 30.

Between the recordation of the interferograms with the CCD-camera 27, the test object is here displaced by such amounts that the image of the displacement in the plane of the camera amounts to an integer multiple of the pixel spacing of the camera sensor. The evaluation of the interferograms and especially the imaginary displacement compensation by the computer 30 and the averaging of the phase maps takes place in a manner analogous to the embodiment of FIG. 1a. However, since the test object here is displaced relative to the Fizeau plate 24, the averaging of the phase maps effects also a low-pass filtering of the interferogram components caused by the Fizeau plate.

Figure 2C:
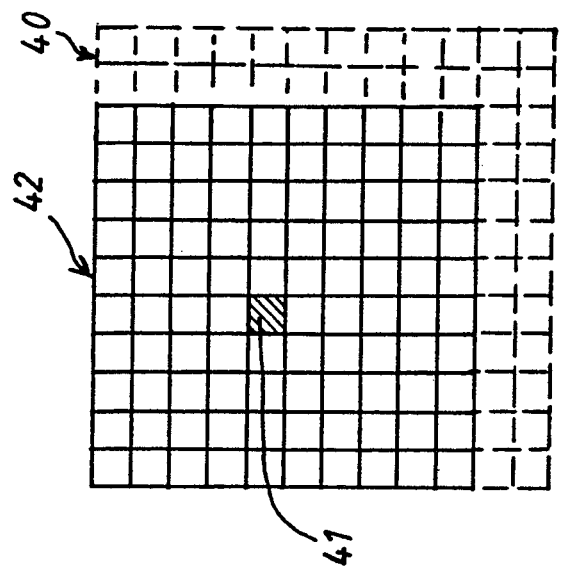
FIGS. 2a to 2c are three diagrams for explaining the virtual displacement compensation.
Figure 2B:
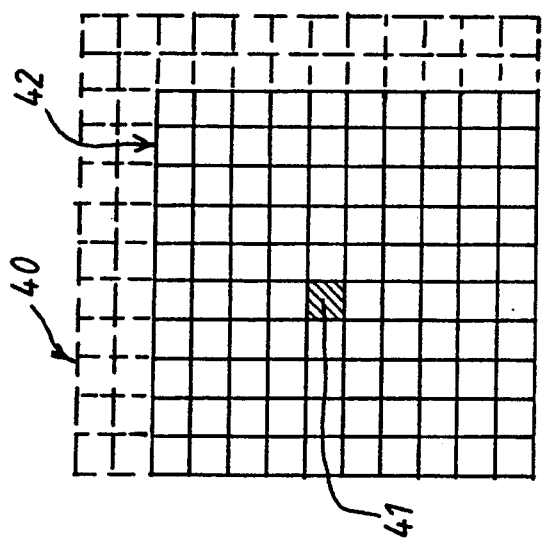
Figure 2A:
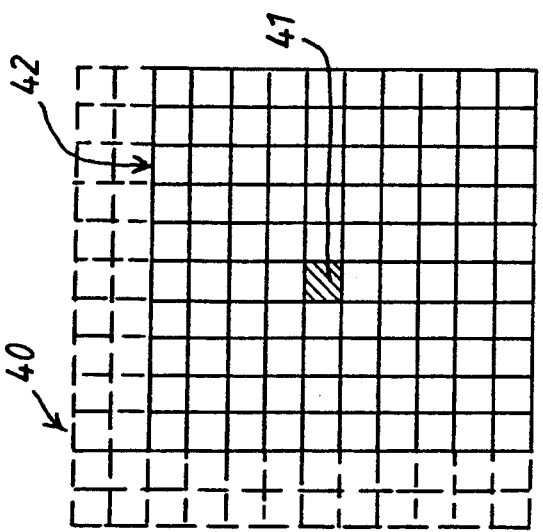

For explaining the virtual compensation of the displacement by means of the computer, a camera sensor 40 is shown by broken lines in each of the FIGS. 2a to 2c. To provide an overview, only 12×12 pixels are represented by broken line squares. In the computer, a phase value is computed for each pixel of the camera from the measured values of intensity. The computed two-dimensional function of the phase values (the phase map) is stored in the image memory 42 which is here represented by a two-dimensional field of 10×10 storage locations.

The broken line square 41 identifies a characteristic test object region. In the first camera image (FIG. 2a), this test object region 41 is imaged on the camera pixel which is in the seventh row (counted from the upper left) and in the seventh column. The phase value corresponding to this test object region 41 is stored at the storage location of the fifth line in the fifth column (counted again from top left) of the image memory 42.

Before recording the second interferogram, the image of the test object on the camera sensor 40 is displaced by two pixels toward the left (FIG. 2b) because of the displacement of the test object. Accordingly, the characteristic testing region 41 is now imaged on the pixel in the seventh line and the fifth column. When storing the phase value corresponding thereto in the image memory 42, the test object displacement is now compensated however so that the phase value belonging to the test object region 41 is again stored at the memory location of the fifth line and the fifth column of the image memory 42. The same applies when the test object image is displaced by two pixels upwardly (FIG. 2c) with the recordation of the third interferogram.

Figure 3:
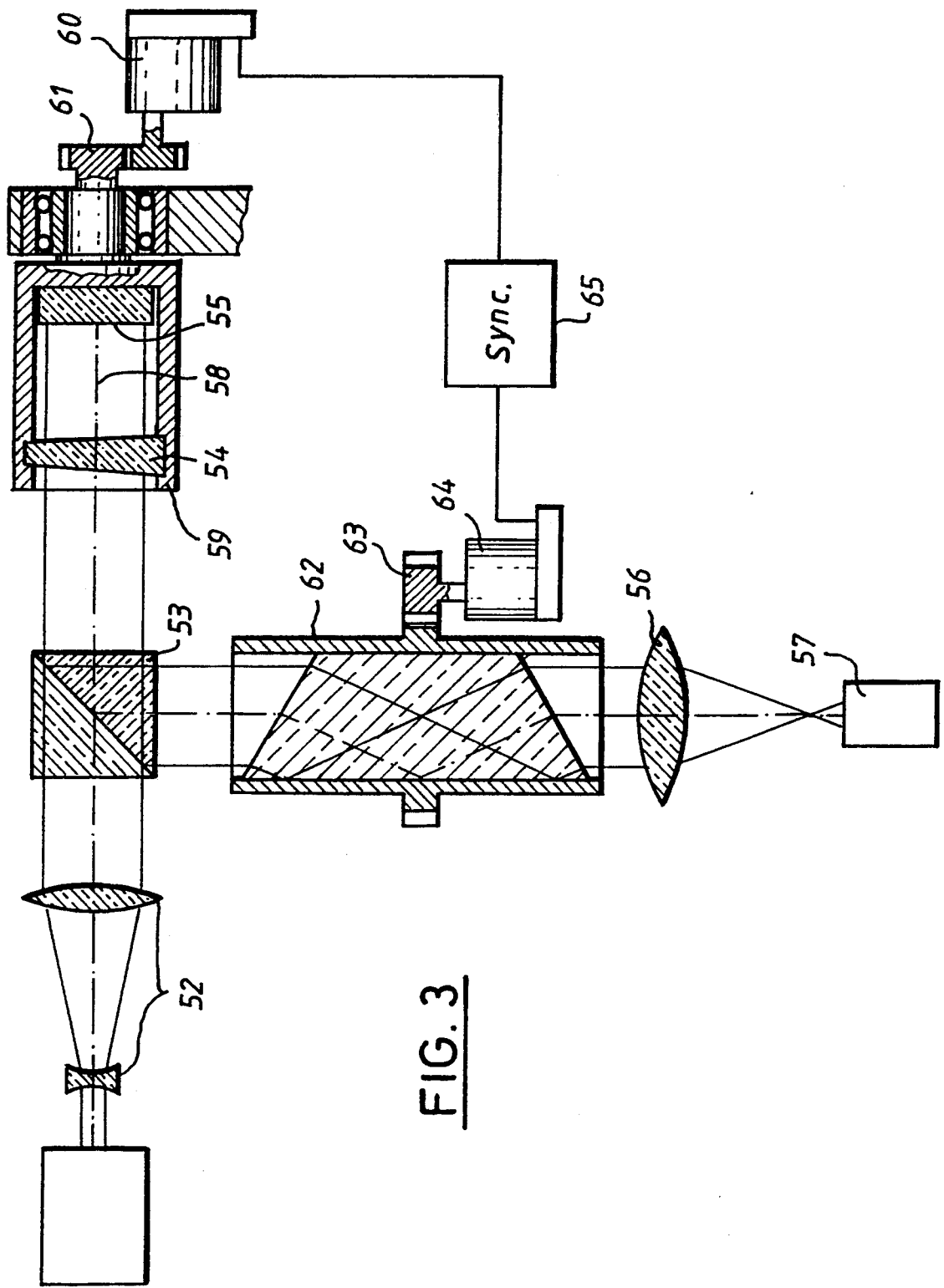
FIG. 3 is a third Fizeau interferometer wherein the reference surface and the test object are accommodated in a common rotatable holder.

In the embodiment of FIG. 3, the Fizeau plate 54 and the test object 55 are accommodated in a common holder 59. The holder 59 is rotatable about the optical axis 58 of the measuring beam path with the aid of a stepping motor 60 and a transmission 61. The relative movement between the test object wave and the reference wave on the one hand and the scatter waves or reflection waves emanating from the beam splitter 53 or the telescope 52 on the other hand is here generated by means of a rotational movement. An image inverting prism 62 (a Dove prism) is mounted between the beam splitter 53 and the camera 57 and is likewise rotatable about the optical axis. The rotation of the Dove prism 62 takes place via a further stepping motor 64 and a transmission 63 by the same angular amount as the rotation of the holder 59. For this purpose, the two stepping motors (64, 60) are driven in common via a synchronization unit 65. This synchronization unit ensures that the lens 56 always images the same point of the test object 55 on the same point of the camera 57 independently of the angular position of the holder 59. The evaluation of the camera images can then take place by means of the evaluation computer shown in FIG. 5. Alternatively, the rotation of the camera image can be compensated when storing the phase values in the image memory also without a synchronously rotated Dove prism by electronic means.

The movement of the test object relative to the camera can be mechanically compensated also in the embodiments of FIGS. 1a and 1b in that the camera is likewise displaced in correspondence to the displacement of the test object or a second pivotable plane-parallel plate is mounted in the beam path between the camera and the beam splitter.

Figure 4:
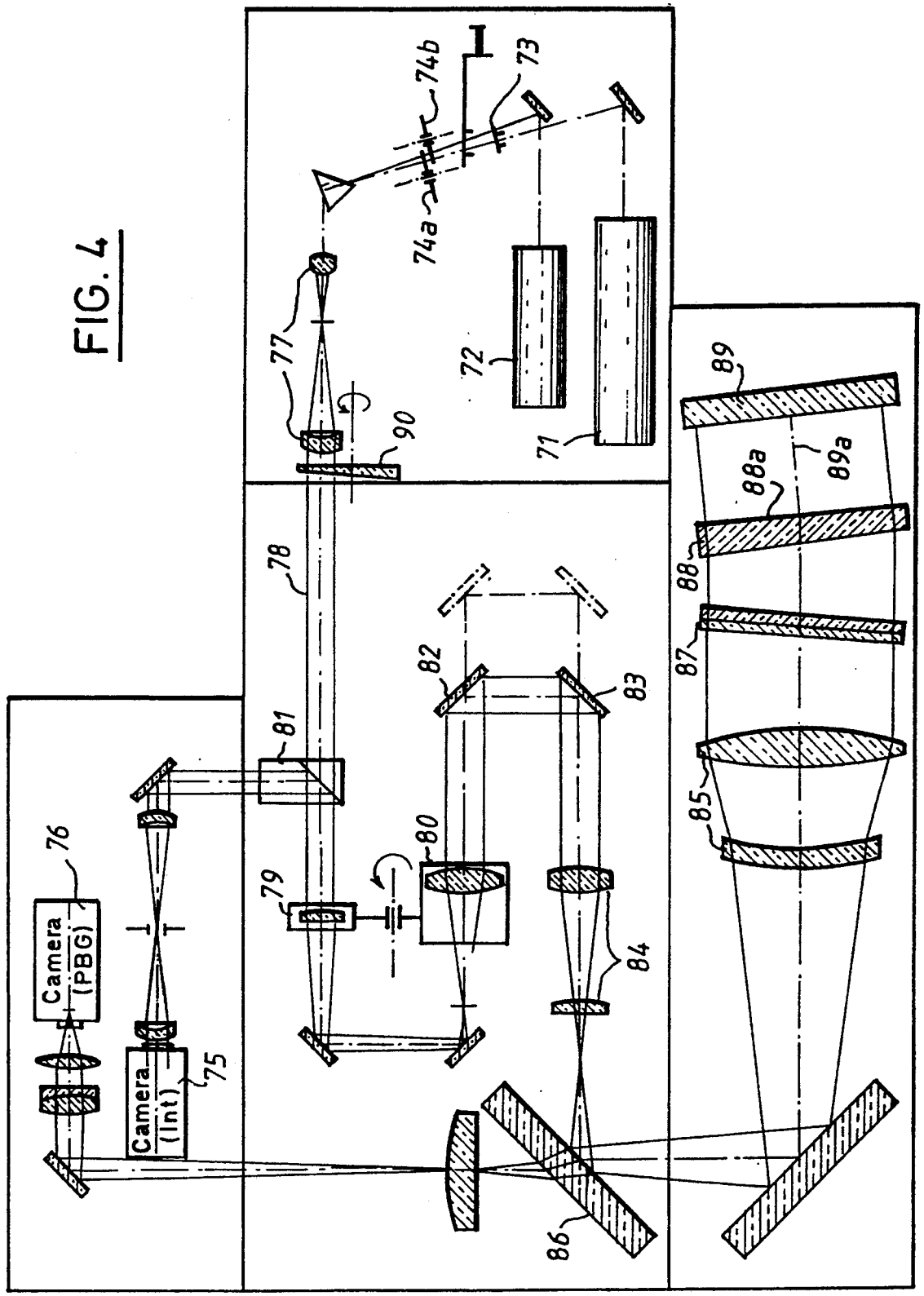
FIG. 4 is a schematic diagram showing the beam path of a fourth Fizeau interferometer having a rotating wedge prism at the input of the interferometer; and, FIG. 5 is a block diagram of an evaluating computer for rapid averaging.

The interferometer of FIG. 4 has two helium-neon lasers (71, 72) which radiate spatially and temporally coherent light at two different wavelengths. One of the two beams can be interrupted alternately by a shutter 73 depending upon the wavelength at which operation takes place. The exposure time of the two cameras (75, 76) is adjustable by means of two phase-shifted choppers (74a, 74b) which rotate synchronously. The first telescope 77 expands the laser beam. A wedge prism 90 is mounted behind the telescope 77 and is rotatable about an axis parallel to the optical axis. The collimated laser beam 78 traces a circular path by means of the rotation of the wedge prism 90.

A second telescope (79, 80) on a turret is mounted behind a polarization beam splitter 81. By rotating the turret, different lens combinations (79, 80) can De inserted into the beam path and therefore different magnifications are adjustable. Two focussing mirrors (82, 83) and an additional focussing lens system 84 are mounted downstream in the beam path. A Fizeau plate 88 and the test object 89 are mounted in the collimated beam path behind a partially-transmitting mirror 86, a collimator objective 85 and a λ/4-plate 87. The waves are reflected at the test object 89 and at the surface 88a of the Fizeau plate 88 facing toward the test object 89. These waves are essentially reflected back into themselves and are reflected by the polarization beam splitter 81 to the camera 75 and generate a multiple-fringe interferogram in the plane of the camera sensor. For generating this multiple-fringe interferogram, the surface 88a of the Fizeau plate 88 facing toward the test object 89 is inclined to the surface normal 89a of the test object 89.

The waves which arise by reflection or scattering at the numerous optical components in the beam path are however superposed on the test wave and the reference wave. The optical path length is adjusted in the interferometer via the focussing mirrors (82, 83) in such a manner that the test object 89 is sharply imaged on the camera 75. The image of the test object 89 on the camera 75 is therefore independent of the instantaneous direction of the incident light beam 78. In contrast thereto, the remaining components arranged in the beam path are imaged unclear on the camera 75. The coherent noise components arising from these components therefore migrate across the camera in dependence upon the direction of the incident light beam. The influence of these noise components is suppressed in the subsequent processing with the evaluation computer according to FIG. 5.

The evaluation computer of FIG. 5 is described in U.S patent application Ser. No. 692,127, filed Apr. 26, 1991, incorporated herein by reference. This evaluating computer has a CCD-camera K with which the interferograms are recorded. The camera K has overall 512 lines and 512 columns of which here only four lines and four columns are shown. The intensity values measured in the data points P (i, j) are each digitalized to an 8-bit data width in an analog/digital converter. The corresponding phase values are computed in a computation unit 101 from the digitalized intensity values in accordance with the 4-stage algorithm described in the above-cited dissertation of B. Dörband or according to the method described in U.S. patent application Ser. No. 694,656 filed May 2, 1991, incorporated herein by reference. These phase values all lie within the interval $-\pi$ and $+\pi$ (1-1/128), that is, the phase maps still contain so-called phase discontinuities.

The phase values computed in the computation unit 101 are stored in an image memory 102. The image memory 102 is serially read out at a fixed frequency pregiven by a synchronization unit 103. The read-out frequency corresponds to that frequency with which the CCD-camera K is also read out.

The phase values stored in the intermediate memory 102 are conducted to the two inputs of a first subtractor/differentiator 104. A delay line 105 is provided in one of the two inputs of the subtractor/differentiator 104 and the delay effect of the delay line 105 is one period of the frequency pregiven by the synchronization unit 103. Accordingly, the first subtractor/differentiator 104 subtracts the phase values of two mutually adjacent data points of the same line of the camera K. The output signals or this first subtractor/differentiator 104 are defined with the same data width of 8 bits as the input signals. This corresponds in a mathematical sense to a modulo $2\pi$ representation of the differences computed by this subtractor/differentiator 104. These differences are transformed to 16-bit data width only at the input of a first addition stage 106. The output signals of a second image memory 107 are supplied to the second input of the addition stage 106. These signals already have a data width of 16 bits. The second image memory 107 is serially read out synchronously to the first image memory 102. The output signals of the addition stage 106 are stored in the image memory 107 again with 16-bit data width.

A second subtractor/differentiator 108 is connected in parallel to the first subtractor/differentiator 104. The inputs of the second subtractor/differentiator 108 are likewise connected to the outputs of the first image memory 102. However, a delay line 109 is provided in one the inputs of this second subtractor/differentiator 108, which has a delay effect of precisely the (a)-multiple of the period of the frequency pregiven by the synchronization unit 103. Here, (a) is the number of the data points in a line of the camera K. The second subtractor/differentiator 108 therefore forms the difference of the phase values of two mutually adjacent points of the same column of the camera K. The output signals of the second subtractor/differentiator are shown in the same data width of 8 bits as the input signals and are transformed to 16-bit data width only in the input of a second addition stage 110. The output signals of a third image memory 111 are supplied to the second input of the second addition stage 110. These signals already have a data width of 16 bits. The third image memory 111 is, in turn, read out synchronously to the intermediate memory 102 and the output signals of the second addition stage 110 are, in turn, stored in the third image memory 111 with 16-bit data width.

The memory location of the second image memory 107 assigned to the data point P (i, j) contains the difference summed over several images of the camera K between the phase values in the data point P (i, j) and the adjacent data point of the same line P (i+1, j). The memory location assigned to the data point P (i, j) of the third image memory 111 contains the difference summed up over the same number of images of the camera K between the phase values in the data point P (i, j) and the adjacent data point of the same column P (i, j+1). With this evaluating computer, it is possible to average the phase maps in video real time. These phase maps are computed by the computation unit 101 and have phase discontinuities associated therewith. A counter 112 counts the number of averaged phase maps. In a computer 113, the phase function can be determined as a function of the position coordinates with great precision from the memory content of the image memories 107 and 111 and a so-called phase unwrapping procedure can be carried out. The evaluation result is then subsequently displayed on a monitor 114.

A computer corresponding to the one in FIG. 5 can be used for averaging the interferograms which are recorded with the arrangements of FIGS. 1a and 1b. The addressing for the movement compensation takes place by means of the computer when reading in the phase maps into the first image memory 102. This computer also controls the movement of the test object or the plane-parallel plate.

Only displacements and rotations were described for the relative movements in the above embodiments. However, it is also possible to combine movement forms such as displacing the test object and simultaneously rotating the same about an axis perpendicular to the surface of the test object.

The invention is not limited only to Fizeau interferometers; however, it can also be advantageously utilized in Twyman-Green or Mach-Zehnder interferometers.

It is understood that the foregoing description is that of the preferred embodiments of the invention and that various changes and modifications may be made thereto without departing from the spirit and scope of the invention as defined in the appended claims.

What is claimed is:

1. A method of recording and evaluating interferograms of a test object, the method comprising the steps of: providing an interferometer for producing said interferograms and having a light source providing spatially and temporally coherent light and having optical components for transmitting object test waves and reference waves produced in the interferometer which interfere to produce a first interferogram component, and for transmitting additional waves of said light which interfere to produce a second interferogram component, said additional waves of light being produced by unwanted scattering and reflection in said optical component;

providing a camera having a light-sensitive surface for receiving said first and second interferogram components thereon;

recording a first interferogram or a first set of interferograms of a superposition of said first and second interferogram components;

generating a movement of said test and reference waves relative to said additional waves;

recording a second interferogram or a second set of interferograms of a superposition of said first and second interferogram components after said movement;

providing a computer connected to said camera and preparing a first phase map in said computer from said first interferogram or said first set of interferograms;

preparing a second phase map in said computer from said second interferogram or said second set of interferograms; and, evaluating said first and second phase maps in said computer to eliminate said second interferogram components from said phase maps.

2. The method of claim 1, further comprising the steps of generating a plurality of said movements; preparing a phase map after each of said movements; and, then averaging said phase maps.

3. The method of claim 1, wherein said light is laser light and said interferograms are recorded without means being interposed which reduces the coherence of the light.

4. The method of claim 1, wherein the test object is imaged on said light sensitive surface of said camera and said relative movement is generated by varying the radiation direction of the interfering light rays.

5. The method of claim 1, wherein said movement is generated by moving the test object.

6. An interferometer for conducting tests on a test object, the interferometer comprising:

a light source for providing spatially and temporally coherent light;

optical transmitting means defining an optical axis along which said coherent light is transmitted toward the test object to produce a test wave;

optical reference means for reflecting light from said light source to produce a reference wave which interferes with said test wave to produce a first interferogram component;

a camera having a light-sensitive surface;

said optical transmitting means including optical means for directing said test and reference waves to said light-sensitive surface;

said optical transmitting means having inherent optical defects which cause said optical transmitting means to transmit additional waves to said light-sensitive surface which interfere to produce a second interferogram component;

said camera being a recording camera for recording a first interferogram of a superposition of said first and second interferogram components;

means for generating a movement of said test and reference waves relative to said additional waves thereby producing a second interferogram of a superposition of said first and second interferogram components on said light-sensitive surface for recordation by said recording camera after said movement; and, computer means for preparing first and second phase maps from said first and second interferograms and for evaluating said phase maps to eliminate said second interferogram components from said phase maps.

7. The interferometer of claim 6, said light source being a laser and said laser and said optical transmitting means conjointly defining a portion of said axis which is unobstructed by means which could reduce the coherence of the light generated by said laser.

8. The interferometer of claim 6, wherein the test object has fixed points having respective phase values corresponding thereto; and, said interferometer further comprising an image memory having a plurality of memory locations; and, said phase values always being stored at the same ones of said memory locations independently of said movement.

9. The interferometer of claim 6, further comprising means for averaging said phase maps.

10. The interferometer of claim 6, said means for generating said movement including actuator means for moving the test object perpendicularly to said optical axis.

11. The interferometer of claim 10, wherein said movement of the test object is controlled by said computer means.

12. The interferometer of claim 11, wherein said recording camera is a CCD-camera having a predetermined pixel spacing; and, wherein the displacement of the image of the test object on said light-sensitive surface being an integer multiple of said pixel spacing of said CCD-camera.

13. The interferometer of claim 11, further comprising image memory means for storing said phase maps; and, said computer means being configured to control said image memory means so as to cause said movement of said test object to be virtual compensated.

14. The interferometer of claim 1, said interferometer being a Fizeau interferometer and said optical reference means being a reference mirror; said means for generating a movement including a holder for holding said reference mirror and the test object; and, means for rotating said holder with said reference mirror and the test object about said optical axis.

15. The interferometer of claim 6, said optical transmitting means and said optical reference means conjointly defining a portion of a beam path common to both said test wave and said reference wave; said means for generating said movement including a plane-parallel plate disposed in said portion of said beam path; and, means for rotating said plane-parallel plate about two axes each perpendicular to said optical axis.

16. The interferometer of claim 6, said means for generating said movement including a beam deflection device.

17. The interferometer of claim 16, said beam deflecting device including a wedge prism and means for rotating said wedge prism.

18. The interferometer of claim 16, said beam deflecting device including a pair of wedge prisms and means for driving said pair of wedge prisms at different speeds.

19. The interferometer of claim 6, said means for generating said movement including actuator means for moving the test object about said optical axis.

20. The interferometer of claim 19, wherein the movement of the test object is controlled by said computer means.

21. The interferometer of claim 20, wherein said recording camera means is a CCD-camera having a predetermined pixel spacing; and, wherein the displacement of the image of the test object on said light-sensitive surface being an integer multiple of said pixel spacing of said CCD-camera.

22. The interferometer of claim 20, further comprising image memory means for storing said phase maps; and, said computer means being configured to control said image memory means so as to cause said movement of said test object to be virtual compensated.

23. The interferometer of claim 6, said means for generating said movement including actuator means for moving the test object perpendicularly to said optical axis and about said optical axis.

24. The interferometer of claim 23, wherein the movement of the test object is controlled by said computer means.

25. The interferometer of claim 24, wherein said recording camera is a CCD-camera having a predetermined pixel spacing; and, wherein the displacement of the image of the test object on said light-sensitive surface being an integer multiple of said pixel spacing of said CCD-camera.

26. The interferometer of claim 24, further comprising image memory means for storing said phase maps; and, said computer means being configured to control said image memory means so as to cause said movement of said test object to be virtual compensated.

* * * * *

UNITED STATES PATENT AND TRADEMARK OFFICE
CERTIFICATE OF CORRECTION

PATENT NO. : 5,357,341

DATED : October 18, 1994

INVENTOR(S) : Michael Küchel, Karl-Heinz Schuster and Klaus Freischlad

It is certified that error appears in the above-identified patent and that said Letters Patent is hereby corrected as shown below:

In the title page, in the abstract, line 4: delete "tile" and substitute -- the -- therefor.

In column 1, line 20: delete "tile" and substitute -- the -- therefor.

In column 1, line 39: between "roughening" and "the", insert -- of --.

In column 1, line 40: delete "$\phi$" and substitute -- $\delta$ -- therefor..

In column 1, line 42: delete "lean" and substitute -- lead -- therefor.

In column 1, line 44: delete "(x y)" and substitute -- (x, y) -- therefor.

In column 1, line 45: delete "(x y)" and substitute -- (x, y) -- therefor.

In column 7, line 37: delete "De" and substitute -- be -- therefor.

UNITED STATES PATENT AND TRADEMARK OFFICE
CERTIFICATE OF CORRECTION

PATENT NO. : 5,357,341

DATED : October 18, 1994

INVENTOR(S) : Michael Küchel, Karl-Heinz Schuster and
Klaus Freischlad

It is certified that error appears in the above-identified patent and that said Letters Patent is hereby corrected as shown below:

In column 8, line 36: delete "or" and substitute -- of -- therefor.

In column 8, line 55: between "one" and "the", insert -- of --.

Signed and Sealed this

Third Day of January, 1995

Attest:

BRUCE LEHMAN

Attesting Officer

Commissioner of Patents and Trademarks